United States Patent Office 3,511,787 Patented May 12, 1970

3,511,787

FOAMED PLASTISOL COMPOSITION CONTAINING A REACTIVE SILICA MATERIAL

Orlando L. Bertorelli, Havre de Grace, and John F. Dacey, Aberdeen, Md., assignors to J. M. Huber Corporation, Locust, N.J., a corporation of New Jersey No Drawing. Filed Apr. 13, 1964, Ser. No. 359,442
The portion of the term of the patent subsequent to June 27, 1984, has been disclaimed
Int. Cl. C08j *1/18, 1/20, 1/22*
U.S. Cl. 260—2.5 7 Claims

ABSTRACT OF THE DISCLOSURE

The disclosure is directed to the formation of foamed vinyl polymers for use as automobile crash pads, shoe inner soles, cloth backing, rug backing, and the like. A highly reactive particulate silica is combined with the blowing agent to produce stronger and lower density foams.

Vinyl polymer foams constitute a valuable class of materials which are finding increasingly wide application in the fabrication of numerous industrial and consumer articles such as automobile crash pads, shoe inner soles, cloth backing, rug backing, and the like. Generally, the vinyl foams are produced from plastisols to which a chemical blowing agent has been added.

As is well understood in the art, a plastisol is a colloidal dispersion of finely divided vinyl chloride polymer in a liquid plasticizer. A plastisol can contain from about 35 to about 400 parts by weight of the liquid plasticizer for every 100 parts by weight of vinyl chloride polymer. The viscosity of a plastisol varies from a thin liquid to a thick paste depending upon the plasticizer content and amount of thixotropic agents or other additives in the composition.

Liquid plasticizers commonly used in the formation of plastisols are dioctyl phthalate, butyl decyl phthalate, dioctyl adipate, dioctyl sebacate, tricresyl phosphate, trioctyl phosphate, didecyl phthalate, acetyl tributyl citrate, and the like. Other additives such as colorants, fillers, stabilizers, blowing agents, and various modifiers can also be incorporated into plastisol compositions.

The plastisols commonly in use today are those containing polyvinyl chloride, and/or copolymers of vinyl chloride with vinyl acetate, vinylidene chloride or maleic acid esters as the vinyl chloride polymer constituent.

When the plastisols are heated, the vinyl polymer forms a homogeneous mass which upon cooling, depending upon formulation, becomes a dry cohesive plastic possessing handling properties ranging from very tough and hard to soft and flexible. If the plastisol contains a chemical blowing agent, the heat causes the blowing agent to decompose, releasing a gas which results in a cellular foam in the softened or molten polymer. Upon cooling, the foam retains its cellular structure. Chemical blowing agents are either organic or inorganic substances which break down at elevated temperatures to form gaseous decomposition products. These gases, dispersed as minute bubbles, expand the fused plastisol while it is in a molten or semi-fluid state leaving a macroscopic honey-comb structure upon cooling.

In order to reduce the cost of foam-plastisol formulations, fillers are incorporated therein. Usually, when a filler is used in large quantities it has a deleterious effect on one or more of the physical properties of the foam, particularly foam structure, foam density, and tear resistance.

The fillers in use today in vinyl foams, such as ground limestone, mica, and wood flour have a degrading effect on the foam density of vinyl foams.

It is an object of this invention to provide improved foamable vinyl polymer compositions.

It is a further object of this invention to provide low density vinyl polymer foams.

Other objects and advantages of this invention will be apparent from the following description thereof.

The objects of this invention are accomplished by incorporating into a foam-plastisol, a finely divided, inorganic highly reactive particulate silica with unique chemical and physical characteristics. This finely divided reactive silica is described in detail in U.S. Pat. No. 3,328,124 along with its preparation. Because of its unique characteristics, the highly reactive silica, contrary to the commonly used materials, actually causes the blowing agent to be more efficient with the result that the foamed vinyl polymer has a lower density with more uniform and finer cell structure than when no filler is used.

Without intending to be bound by any specific theory, it appears that the particular siliceous material used in this invention exerts both chemical and physical effects on blowing agents. Apparently, the siliceous material increases the dispersion of the blowing agent and prevents its reagglomeration, thus insuring its most efficient use. A visual examination of vinyl foams made with and without the siliceous material reveal obvious differences since undecomposed agglomerates of blowing agent are seen in the unfilled foam.

Because of the unique chemical reactivity of these siliceous materials, they exert a chemical activating effect on the blowing agents. Even in the presence of other activating materials such as dibasic lead phthalate, the siliceous materials used in this invention are effective and exhibit a synergistic effect with blowing agent activators, as will be shown.

The siliceous materials used as a combination activator/promoter blowing aid are particulate in form consisting essentially by analysis, of silica and bound water. They are discrete particles which have a distinctly phylloidal (leaf-like) structure characterized, among other things, by a very great width to thickness ratio, or thinness. These materials contain, by chemical analysis, at least 82% by weight of $SiO_2$ together with at least 5% of bound or combined $H_2O$ and less than 12% of other oxides. Structurally, the atoms of silicon, oxygen and hydrogen are linked in an orderly laminar arrangement giving the individual particles their distinctly phylloidal form. The siliceous materials are further described as having variegated facial dimensions in the range of from about 0.1 to 5 microns, the preponderant particle widths generally being about 0.5 to 2 microns. Their thicknesses are smaller, ranging typically from as little as about 0.005 micron up to about 0.050 micron. As shown, for example, by stereoptic and shadowgraphic electron micrographs, their characteristic or preponderant thickness amounts to about 0.008 to about 0.015 micron and the particles thus have an extremely high characteristic width to thickness ratio of the order of magnitude of 100 to 1.

The BET surface area of the materials, as determined by the well known Brunauer, Emmett, and Teller Method ("BET Multilayer Absorption Theory," Journal of the American Chemical Society, vol. 60, 1938, page 309) generally is in the range of about 40 to 130 square meters per gram.

These materials are further characterized by having their total surface area constituted to a very important extent by measurable porosity in the elementary particles. From about 10 to about 40% of the surface area is formed by pores.

The preparation of siliceous materials is described in Pat. No. 3,328,124 and involves the hydrothermal reaction of a strong mineral acid with aluminum silicate materials. The term highly reactive particulate silica, as d in this specification and the appended claims, is ited to the siliceous materials described and claimed U.S. Pat. No. 3,328,124. Typical examples follow:

EXAMPLE 1

00 pounds of a kaolin clay refined so as to have 55 50% of its particles smaller than 2 microns and only to 25% of its particles coarser than 5 microns (an floated soft clay mined and refined at Langley, S.C.) dispersed thoroughly in 453 pounds of water contain- 1.0 pound of tetrasodium pyrophosphate as a dis- sing aid. The kaolin had a BET surface area of m.$^2$/g. and the following typical analysis:

| | Percent |
|---|---|
| $O_3$ | 39.25 |
| 2 | 45.12 |
| $O_3$ | 0.71 |
| 2 | 0.89 |
| ) | 0.49 |
| O | 0.14 |
| (combined) | 14.13 |

he kaolin dispersion was charged into a preheated -lined pressure reaction vessel. 504 pounds of com- ical 66° Baumé sulfuric acid containing 93.19% by ght $H_2SO_4$ was then added, this quantity of acid be- 100% of the amount stoichiometric to the total metal e content of the clay and being such as to produce ie water an acid concentration of 49.1%. During the tion of the acid and throughout the reaction, the le body of the dispersion was kept in vigorous agi- n.

pon completion of the addition of the acid, live n was introduced into the reaction vessel until, sev- minutes after starting the steam flow, a violent hermic reaction occurred which brought the material in 11 minutes from zero gauge pressure to a gauge sure of 151 p.s.i. (temperature of 185.5° C.). In 18 ites longer the vessel had dropped to a gauge pres- of 120 p.s.i., corresponding to a temperature of 177° 350° F.). This pressure and temperature were main- d for a period of 4 hours by the regulated introduc- of superheated steam. The reaction vessel was then ed to a pressure of 15–20 p.s.i., and the material was dropped into a body of diluting water which cooled 93° C. It was then filtered to yield a filter cake h was washed to remove free sulfuric acid and inum sulfate and thereafter was dried and disinte- d in a pulverizer.

EXAMPLE 2 ie procedure of Example 1 was followed with the of 512 pounds of water and 568.2 pounds of the iric acid, giving an acid concentration of 49.1%. quantity of acid was 112.8% of the stoichiometric unt. The gauge pressure increased from 0 to 120 in 4 minutes and then to a maximum of 154 p.s.i. which it was reduced to a controlled value of 120 which was held for 4 hours.

EXAMPLE 3 ie procedure of Example 1 was followed with the of 543 pounds of water and 605 pounds of the sul- acid, giving an acid concentration of 49.1%. This itity of acid was 120% of the stoichiometric amount. gauge pressure increased from zero to a maximum 60 p.s.i. in 14 minutes and then dropped to the con- ed value in 14 minutes.

EXAMPLE 4 ie procedure of Example 1 was followed with the of 588 pounds of water and 655 pounds of the sul- acid, giving an acid concentration of 49.1%. This itity of acid was 130% of the stoichiometric amount.

The gauge pressure increased from zero to a maximum of 163 p.s.i. in 12 minutes and then dropped to 120 p.s.i. in 15 minutes.

EXAMPLE 5

The procedure of Example 1 was followed with the use of 680 pounds of water and 756 pounds of the sulfuric acid, giving an acid concentration of 49.1%. The gauge pressure increased from zero to a maximum of 166 p.s.i. in 11 minutes and then dropped to 120 p.s.i. in 16 minutes.

The products of Examples 1 through 5 were tested in a vinyl foam plastisol of the following formula:

| | Phr. |
|---|---|
| Geon 121 [1] | 100 |
| DOP [2] | 95 |
| Paraplex G-62 [3] | 5 |
| Dythal [4] | 3 |
| Celogen AZ [5] | 3 |
| Highly Reactive Particulate Silica | As indicated |

[1] Described in U.S. Pat. 2,188,396—a high molecular weight polyvinyl chloride resin with a specific gravity of 1.4.
[2] Di-2-ethyl hexyl phthalate.
[3] Epoxidized soybean oil.
[4] Dibasic lead phthalate.
[5] Azodicarbonamide.

The plastisols were formulated as follows:

The "Celogen AZ" was dispersed in half the DOP by ball milling overnight. The mixture was then transferred to a "Hobart" Model 50 mixer. The "Dythal" and the highly reactive particulate silica were then added and mixed for five minutes at medium speed. The "Geon 121" was all added and the composition was mixed at low speed for 5 minutes. The mixer speed was then increased to high for 5 minutes. The remainder of the DOP was then added and the composition was mixed at medium speed for 15 minutes. After the mixing was completed, the resulting plastisol was tested for viscosity. 150 grams of the plastisol were then placed in an 8" x 10" mold and allowed to stand for 30 minutes before placing in a 425° F. oven for 6 minutes. The foams were then tested for density.

Table I illustrates the effects of the highly reactive particulate silica material used as an activator/promoter for the chemical blowing agent in this invention as compared to an unfilled plastisol and a plastisol filled with a commercial filler.

TABLE I

| Filler | Loading, phr. | Foam Density, lbs./cu. ft. | Viscosity, Centipoise |
|---|---|---|---|
| None | 0 | 14.0 | 3,250 |
| Ground limestone | 1 | 14.0 | 3,200 |
| Do | 2 | 14.4 | 3,250 |
| Do | 4 | 15.0 | 3,240 |
| Do | 6 | 15.2 | 3,280 |
| Do | 8 | 16.4 | 3,280 |
| Highly reactive particulate silica filler | 1 | 12.6 | 3,240 |
| Do | 2 | 12.0 | 3,240 |
| Do | 4 | 11.6 | 3,300 |
| Do | 5 | 11.5 | 3,320 |
| Do | 6 | 12.0 | 3,340 |
| Do | 8 | 14.2 | 3,520 |

As can be seen from the data in Table I, the highly reactive particulate silica material used as an activator/promoter for the chemical blowing agent according to this invention reduced the foam density significantly when compared to the ground limestone. It also caused a reduced foam density when compared to the foam of the unfilled plastisol. The effect on viscosity was substantially negligible.

If the amount of highly reactive particulate silica is increased to 8 phr. the foam density is increased to more than that of the unfilled pastisol but is still significantly less than that of the plastisol filled with ground limestone.

In order to illustrate the effect of the highly reactive particulate silica of this invention on the blowing time and blowing temperature of the plastisols, the following procedure was used. 50 grams of the plastisol composition mentioned previously were poured into each of six 4" x 6" molds. The molds were placed in a 420° F. oven for 2, 4, 6, 8, and 10 minutes. The resulting foams were tested for density. The effect of blowing temperature was determined with blowing time held constant at six minutes and the temperature varied at 320°, 340°, 360°, 380°, 400°, 420° and 440° F. The resulting foams were tested for foam density.

The data are tabulated in Tables II and III.

TABLE II
[Foam density vs. blowing time]

| Filler | Loading, phr. | Temp., ° F. | Density 2 min. | 4 min. | 6 min. | 8 min. | 10 min. |
|---|---|---|---|---|---|---|---|
| None | 0 | 420 | 58.2 | 28.0 | 13.8 | 14.4 | 16.0 |
| Ground limestone | 5 | 420 | 59.8 | 30.1 | 15.2 | 16.0 | 16.4 |
| Highly reactive particulate silica Material | 5 | 420 | 56.7 | 26.5 | 11.5 | 12.6 | 14.2 |

The data in Table II indicates that the highly reactive particulate silica used in this invention results in the lowest foam density at all blowing times. The six minute blowing time is the optimum for the formulation used.

TABLE III
[Foam density vs. blowing temperature]

| Filler | Loading, phr. | Time, min. | Density 340° F. | 360° F. | 380° F. | 400° F. | 420° F. |
|---|---|---|---|---|---|---|---|
| None | 0 | 6 | 68.8 | 59.6 | 34.0 | 15.3 | 13.4 |
| Ground limestone | 5 | 6 | 68.0 | 60.4 | 34.2 | 17.0 | 15.1 |
| Highly reactive particulate silica | 5 | 6 | 72.3 | 61.3 | 31.2 | 13.3 | 11.2 |

The data in Table III indicate that the highly reactive particulate silica material of this invention causes a lower foam density than limestone filled or unfilled vinyl pastisols at blowing temperatures of at least 380° F. with a 5 phr. loading of filler and a 6 minutes blowing time.

The use of the unique highly reactive particulate silica in vinyl foam plastisol formulations permits a reduction in the amount of relatively expensive blowing agent normally used. A test illustrating this fact was run with a 420° F. blowing temperature and a 6 minute blowing time.

TABLE IV

| Filler | Filler loading, phr. | Blowing Agent | Blowing agent Loading, phr. | Foam density, Lbs./cu. ft. |
|---|---|---|---|---|
| None | 0 | Celogen AZ | 3 | 14.3 |
| Highly reactive particulate silica | 5 | do | 1.0 | 22.8 |
| Do | 5 | do | 1.5 | 18.8 |
| Do | 5 | do | 2.0 | 15.8 |
| Do | 5 | do | 2.3 | 14.3 |
| Do | 5 | do | 2.5 | 13.8 |
| Do | 5 | do | 3.0 | 11.8 |
| Do | 5 | do | 2.9 | 11.5 |
| Do | 0 | do | 5.0 | 11.5 |
| Do | 5 | do | 2.6 | 13.2 |
| Do | 0 | do | 4.0 | 13.2 |

The data in Table IV indicate that a replacement of up to 40% of blowing agent with the highly reactive particulate silica used in this invention results in equivalent foam densities at a substantial saving in raw material cost.

The effect of the highly reactive particulate silica, on the decomposition of the blowing agent, was tested by first heating the blowing agent in a DOP solution and measuring the gases which resulted on decomposition.

The highly reactive particulate silica was added to the blowing agent-DOP solution in the same proportions as used in the plastisol formulations.

"Dythal" which is a promoter-stabilizer was tested with and without the highly reactive particulate silica in the same plastisol formulations.

By measuring the gas volume at various decomposition temperatures, the effects of the promoters, used separately and together were determined.

About one gram of azodicarbonamide blowing agent was decomposed with heat in 50 ml. of DOP. The same method was used with the stabilizer promoter (Dythal) mixed with the blowing agent, with the stabilizer promoter and filler mixed with the blowing agent and with the filler alone mixed with the blowing agent. The gases were collected at a pressure of 767 mm. and a temperature of 22° C.

TABLE V.—THE EFFECTS OF PROMOTERS ON THE DECOMPOSITION OF AZODICARBONAMIDE BLOWING AGENT

| Promoter | Temperature, ° C. (Gas vol. corrected to STP) 120 | 130 | 140 | 150 | 160 | 170 | 180 | 190 | 200 | 210 | 220 | 230 | 235 |
|---|---|---|---|---|---|---|---|---|---|---|---|---|---|
| None | 11.7 | 16.3 | 21.5 | 24.3 | 28 | 30.4 | 37.4 | 46.7 | 63.0 | 102.7 | 144.8 | 247.5 | 254 |
| Highly reactive particulate silica | 23.4 | 28.0 | 35.0 | 46.7 | 56.0 | 70.5 | 93.4 | 126.0 | 177.5 | 219.5 | 303.6 | 326.9 | |
| Dythal | 21.0 | 25.7 | 32.7 | 42.0 | 60.7 | 102.7 | 140.1 | 182.1 | 208.8 | 228.0 | 233.5 | | |
| Highly reactive particulate silica plus Dythal | 51.4 | 60.7 | 79.4 | 48.1 | 116.7 | 144.8 | 177.5 | 214.8 | 224.2 | 233.5 | 247.5 | | |

The data in Table V indicate that the unique highly reactive particulate silica filler utilized in this invention decreases decomposition temperatures at equal gas volumes and when the filler is combined with the stabilizer, the effects are even greater. The data indicates a synergistic decomposition promoting effect between the stabilizer and the highly reactive particulate silica filler.

A vinyl plastisol was formulated substituting a non-promoting stabilizer for the Dythal, using the same formula as previously. Without the unique highly reactive particulate silica filler, the foam density was 18.6 lbs./ft.$^3$ and with 5 phr. of siliceous filler the foam density was 12.11 lbs./ft.$^3$. The non-promoting stabilizer was a non-lead heavy metal organic complex compound (Mark Q-228, Argus Chemical Company).

The effect of the highly reactive particulate silica pigment on the dispersion of the blowing agent was determined by preblending the pigment and blowing agent in various relative proportions, then incorporating the blend into the plastisol formulation. The blends were measured so that the amount of blowing agent incorporated into the plastisol formulation was 3 phr. The test was run at 420° F. for 6 minutes.

TABLE VI

| Percent pigment in blowing agent by weight | Foam density lbs./cu. ft. |
|---|---|
| 0 | 14.4 |
| 5 | 13.8 |
| 10 | 13.9 |
| 20 | 13.4 |
| 40 | 12.9 |
| 60 | 11.8 |

The invention has been illustrated with specific blowing agents but is not limited thereto. Other similar acting blowing agents suitable for use in this invention are azobisisobutyro-nitrile, diazo-aminobenzene, N,N'-dimethyl-N,N'-dinitroso-terephthalamine, N,N'-dinitroso-pentamethylenetetramine, benzenesulfonyl-hydrazide, benzenedisulfonyl hydrazide, diphenylsulfon-3,3'-disulfonyl razide, and 4,4'-oxybis (benzenesulfonyl hydrazide). 'he polyvinyl chloride plastisol formulation used like- is used merely for purposes of illustration and is resentative of those used and known and in no way is ntended that the invention be limited to the specifics mplified, only by the appended claims.

Ve claim:

. A foamable vinyl chloride polymer plastisol com- ition, comprising a plasticizer, a secondary plasticizer, eat stabilizer, a vinyl chloride polymer, a chemical ving agent and an inorganic activator/promoter for chemical blowing agent, comprising a reactive silica erial composed of discrete, phylloidal, particles con- ing, by analyses based upon their weight when dry at ° C., at least 82% of $SiO_2$, from 5 to 10% of $H_2O$, less than 10% of other oxides, the facial dimensions aid particles being in the range of from about 0.1 to ut 5 microns, their thicknesses being in the range of n about .005 to about .050 micron and their BET ace area being in the range of from 40 to 130 m.²/g.

. The composition of claim 1 wherein the amount of activator/promoter is at most 8 parts per hundred s of polymer, by weight.

. A foamed vinyl chloride polymer composition con- ing an activator/promoter for the chemical blowing it comprising a reactive silica material composed of rete, phylloidal, particles containing, by analyses based n their weight when dry at 105° C., at least 82% of $_2$, from 5 to 10% of $H_2O$, and less than 10% of r oxides, the facial dimensions of said particles being he range of from about 0.1 to about 5 microns, their knesses being in the range of from about .005 to about micron and their BET surface area being in the e of from 40 to 130 m.²/g. said foam having an ap- nt density of from 11 to 14 pounds per cubic foot.

. The composition of claim 3 wherein the amount of vator/promoter for the chemical blowing agent is at t 8 parts per hundred parts of polymer, by weight.

. A plastisol chemical blowing agent-activator/pro- er composition consisting of at least 40% by weight licarbonamide and at most 60% by weight of an in- nic, highly reactive particulate silica material com- d of discrete, phylloidal, particles containing, by yses based upon their weight when dry at 105° C., east 82% of $SiO_2$, from 5 to 10% of $H_2O$, and less 10% of other oxides, the facial dimensions of said icles being in the range of from about 0.1 to about 5 microns, their thicknesses being in the range of from about .005 to about .050 micron and their BET surface area being in the range of from 40 to 130 m.²/g 6 A plastisol chemical blowing agent-activator/promoter composition consisting of at least 40% by weight azobisisobutyronitrile and at most 60% by weight of an inorganic, highly reactive particulate silica material composed of discrete, phylloidal, particles containing, by analyses based upon their weight when dry at 105° C., at least 82% of $SiO_2$, from 5 to 10% of $H_2O$, and less than 10% of other oxides, the facial dimensions of said particles being in the range of from about 0.1 to about 5 microns, their thicknesses being in the range of from about .005 to about .050 micron and their BET surface area being in the range of from 40 to 130 m.²/g 7 A plastisol chemical blowing agent-activator/promoter composition consisting of at least 40% by weight diazoaminobenzene and at most 60% by weight of an inorganic, highly reactive particulate silica material composed of discrete, phylloidal, particles containing, by analyses based upon their weight when dry at 105° C., at least 82% of $SiO_2$, from 5 to 10% of $H_2O$, and less than 10% of other oxides, the facial dimensions of said particles being in the range of from about 0.1 to about 5 microns, their thicknesses being in the range of from about .005 to about .050 micron and their BET surface area being in the range of from 40 to 130 m.²/g.

References Cited

UNITED STATES PATENTS

| | | | |
|---|---|---|---|
| 2,861,898 | 11/1958 | Plutzer. | |
| 2,875,088 | 2/1959 | Stiehl | 260—2.5 |
| 2,907,075 | 10/1959 | Newhy | 260—2.5 |
| 3,072,584 | 1/1963 | Kerpowich. | |
| 3,093,525 | 6/1963 | Wilsen et al. | 260—2.5 |
| 3,160,689 | 12/1964 | Brunner | 260—2.5 |
| 3,202,307 | 8/1965 | Rainer et al. | 260—2.5 |
| 3,256,217 | 6/1966 | Fandler et al. | 260—2.5 |
| 3,261,784 | 7/1966 | Coecke et al. | 260—2.5 |
| 3,328,124 | 6/1967 | Mays et al. | 106—288 |

MURRAY TILLMAN, Primary Examiner

M. FOELAK, Assistant Examiner

U.S. Cl. X.R.

23—182; 106—288; 260—30.6, 31.8, 41